United States Patent [19]
Greene, Jr.

[11] 3,845,779
[45] Nov. 5, 1974

[54] GARDEN HOSE EVACUATING DEVICE

[75] Inventor: Henry E. Greene, Jr., Wilmette, Ill.

[73] Assignee: Waldon Devices, Inc., Wilmette, Ill.

[22] Filed: May 10, 1973

[21] Appl. No.: 359,117

[52] U.S. Cl............... 137/209, 9/14, 137/606, 137/798, 138/32, 285/354
[51] Int. Cl............................................ F16k 51/00
[58] Field of Search............ 9/14, 314, 400; 138/32, 138/103; 137/206, 209, 605, 798; 285/354, 386–389

[56] References Cited
UNITED STATES PATENTS

| 599,224 | 2/1898 | Decarie | 285/354 X |
| 828,597 | 8/1906 | Cowles | 138/32 |
| 1,019,572 | 3/1912 | Whipple | 285/354 X |
| 2,595,715 | 5/1952 | Sloan | 137/209 X |
| 3,543,785 | 12/1970 | Flory | 137/209 |

Primary Examiner—Robert G. Nilson
Attorney, Agent, or Firm—Edward R. Lowndes

[57] ABSTRACT

A pneumatic garden hose evacuating device which, when operatively interposed between a water faucet and the proximate end of a garden hose, affords a means whereby air under pressure may be introduced into the hose to displace the residual water content thereof. The device, in a modified form thereof, when operatively applied to a fire hose, enables the latter to be extended from a collapsed condition and thus rigidified by internal air pressure so that a length thereof may be projected outwardly and endwise over the surface of a sheet of ice for rescue purposes.

5 Claims, 9 Drawing Figures

GARDEN HOSE EVACUATING DEVICE

The present invention relates to a pneumatic garden hose evacuating device and has particular reference to a faucet attachment or adapter for a garden hose and having facilities whereby air under pressure may be introduced into the hose with the attachment in situ on the faucet for evacuating the hose after the faucet has been shut off.

The invention will be found particularly useful during winter months when sub-freezing temperatures are encountered, evacuation of the hose of its liquid content being a precautionary measure against freezing of the liquid within the hose. Winter use of a garden hose is not uncommon, numerous occasions arising when such a use is desirable as, for example, in the washing of an automobile, hosing off an accumulation of sand on a concrete patio, door slab, porch steps, sidewalk or the like, or the filling of an ice skating rink with water preparatory to freezing thereof. Heretofore, in order to protect a garden hose from damage due to freezing of its water content, it has been necessary to drain such hose thoroughly if it is to be left outdoors for an appreciable length of time or, alternatively, to store the hose indoors. Even when this latter expedient is resorted to, it is desirable that the hose be drained coil-by-coil to avoid subsequent spilling of water on the floor. Where single or sectional hose lengths, in excess of 50 feet for example, are concerned, the manual draining of a garden hose is a time-consuming and arduous task, especially in extremely cold weather. Furthermore, invariably it necessitates uncoupling of the hose from the faucet to allow for air pressure equalization so that the water will flow from the hose freely. Most hoses, being opaque, render no indication of the extent of draining and frequently a hose which is believed to have been thoroughly drained will contain a pocket of water which, upon subsequent freezing, not only will afford complete blockage of water flow through the hose during a subsequent attempt at use, but may occasion rupture of the hose when an attempt is made to straighten the curve.

Despite the fact that such manual draining of a garden hose may preclude the possibility of damage to the hose due to freezing, if the hose is to be left outdoors it is expedient that the thus drained hose be again coupled to the faucet for immediate future use. Actual experience has shown that to re-couple a wet hose to its faucet in extremely cold weather is not always possible inasmuch as the time consumed during manual draining of the hose may be adequate for freezing of the moist threaded female fitting at the proximate end of the hose, or for freezing of the moist threaded mating fittings at the opposite ends of any adjacent hose sections which have been uncoupled to facilitate the draining operation.

The present invention is designed to overcome the above-noted limitations that are attendant upon the winter use of a garden hose and, toward this end, the invention contemplates the provision of a novel and extremely simple garden hose faucet attachment or adapter having a female fitting which may be permanently applied to an outdoor water faucet, and a male fitting for reception of the proximate end of a garden hose. The attachment is further provided with a valve nipple by means of which air or other gas under pressure may be injected into the fitting, and consequently into the hose by means of a bicycle pump, compressor or gas cartridge injection device, to the end that water within the hose may displaced and consequently ejected from the hose. By such an arrangement, the faucet attachment, as well as the garden hose, may be allowed to remain more or less permanently in their assembled relationship so that after each use of the hose it may be evacuated of its water content without detaching the same from the faucet while coiled and stored on a reel or rack, or left in a coiled condition on the ground.

The hose evacuating device of the present invention is not necessarily limited to garden hose evacuation and the same may, if desired, by suitable modification if required, be employed for other uses. In a modified form of the invention the device is capable of being employed by a fire department during rescue operations for injecting air into a flexible coiled, folded or otherwise collapsed fire hose section for the purpose of rigidifying the same so as to provide a relatively stiff length of hose which may be projected endwise and forwardly over a sheet of surface ice to the vicinity of a break-through where it may be seized by the person or persons undergoing rescuing. In this form of the invention, the device is operatively applied to the proximate end of the fire hose and the distal end of such hose is provided with a flotation ring, handle or other reaction member which may be grasped by the person undergoing rescuing. Where the break-through occurs at a distance from the shore which is greater than the length of a conventional fire hose section, a second fire hose section may be applied to the device so that injection of air into the latter in a particular manner according to the invention will inflate both sections, after which the device is caused to move outwardly over the ice with the two hose sections being effectively coupled together by the device and thus maintained in axial alignment.

The provision of a hose attachment such as has briefly been outlined above in connection with both garden and fire hose use, and possessing the stated advantages constitutes the principal object of the present invention.

The provision of a hose attachment which is extremely simple in its construction and which therefore may be manufactured at a low cost; one which is comprised of a minimum number of parts, particularly moving parts, and which therefore is unlikely to get out of order; one which is rugged and durable and which will therefore withstand rough usage; one which, except for the body portion thereof, is comprised of commercially available components, therefore contributing to low manufacturing costs; one which, when applied to a water faucet, is rotationally adjustable thereon to accommodate easy application thereto of an air hose fitting or other air injection instrumentality; and one which, otherwise, is well adapted to perform the services required of it, are further desirable features which have been borne in mind in the production and development of the present invention.

Other objects and advantages of the invention, not at this time enumerated, will readily suggest themselves as the nature of the invention is better understood.

In the accompanying two sheets of drawings forming a part of this specification, two illustrative embodiments of the invention have been shown.

Figure 1:
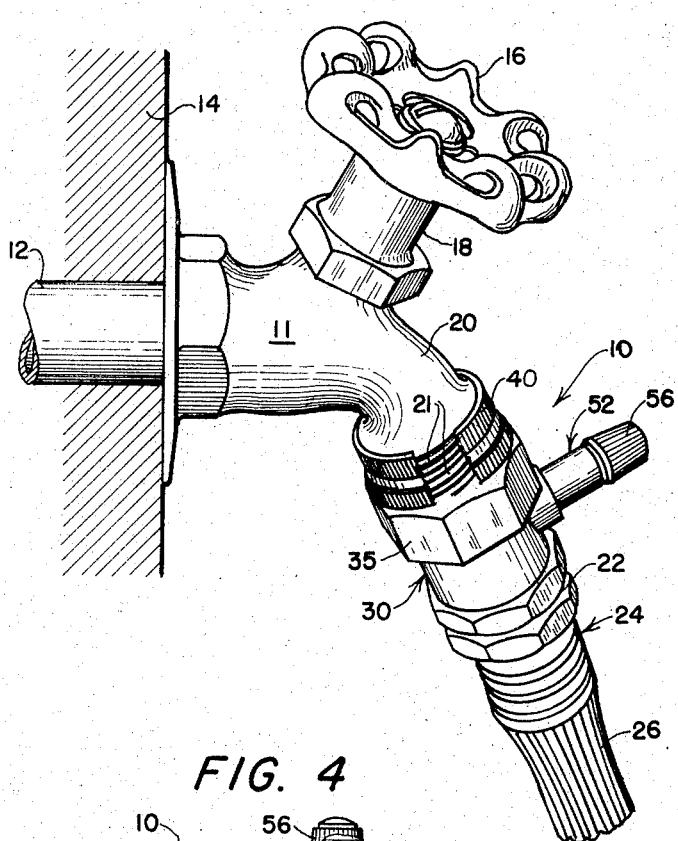
FIG. 1 is a perspective view of a garden hose pressurizing and evacuating device embodying the principles of the present invention and showing the same operatively installed and in use on a water faucet.
Figure 2:
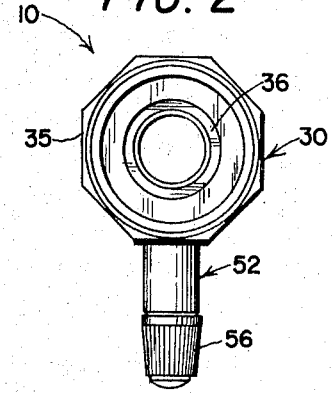
FIG. 2 is a rear end view of the device.
Figure 3:
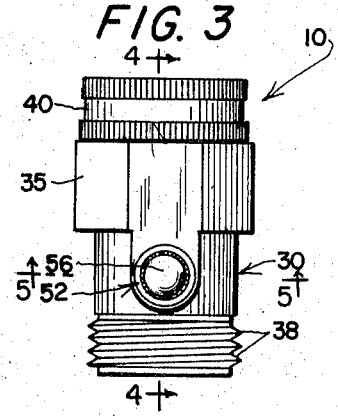
FIG. 3 is a top plan view of the device.

Referring now to the drawings in detail, and in particular to FIG. 1, there is disclosed in this view a conventional water outlet which is associated with a building, the outlet having operatively installed thereon one of the garden hose evacuating devices 10 of the present invention. The water outlet embodies a water faucet 11 which is threadedly received over the outer end of a water pipe 12 which projects outwardly through a building wall 14. The faucet 11 further includes the usual rotary control handle or knob 16 which is carried at the outer end of a valve stem 18 by means of which the internal valve structure of the faucet (not shown) may be actuated. The faucet 11 is of conventional design and no claim is made herein to any novelty associated with the same, the novelty of the present invention residing rather in the construction, combination and arrangement of parts associated with the hose evacuating device 10 and the nature of which will be described in detail presently and subsequently claimed. It will be understood however that the faucet is in the form of an adjustable shut-off valve assembly and embodies an internal valve seat and a cooperating valve element which is carried on the inner end of the valve stem 18 and is movable toward and away from the valve seat to vary the flow of water through the faucet. The faucet further includes an externally threaded discharge spout 20 having male threads 21 formed thereon and which, in the absence of the present garden hose evacuating device 10, is designed for direct threaded reception thereover of the rotary clamping ring or collar 22 which is associated with the female end fitting 24 at the proximate end of a conventional garden hose 26. However, according to the present invention, and in order that the garden hose may be evacuated of its residual water content after a period of use, the device 10 is adapted to be interposed between the faucet and the hose as illustrated, to the end that air under pressure may be applied to the device and thus transmitted to the hose in a manner that will be made clear presently.

Figure 4:
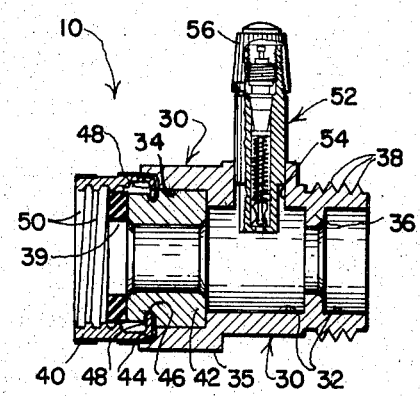
FIG. 4 is a sectional view taken substantially on the line 4—4 of FIG. 3.
Figure 5:
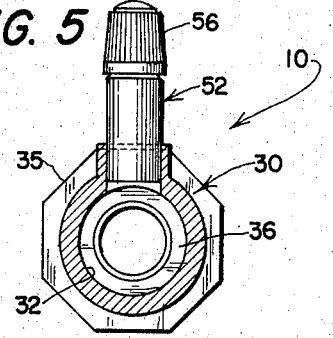
FIG. 5 is a sectional view taken substantially on the line 5—5 of FIG. 3.
Figure 6:
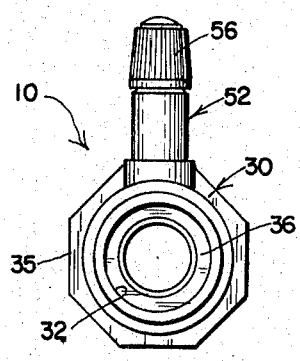
FIG. 6 is a front end view of the device.

Referring now additionally to FIGS. 2 to 6 inclusive and particularly to FIG. 4, the garden hose evacuating device 10 involves in its general organization a generally tubular body 30 which preferably but not necessarily is formed of a suitable plastic material and which is provided with a longitudinal bore 32 and an enlarged counterbore 34. An enlarged octagonal section 35 is provided on the body 30 and serves a function that will be made clear presently. An internal rib 36 extends around the bore 32 in the medial region thereof for reinforcing purposes. The body 30 is provided with what may be regarded as its forward male end with external threads 38 which are designed for threaded reception thereover of the clamping collar 22 of the garden hose 26, while the other or rear female end of the body is provided with a rotatable clamping collar 40 similar to the collar 22 of the hose 26. In order to maintain the collar 40 in position on the body 30, a retaining ring 42 is adhesively or otherwise fixedly secured within the counterbore 34 and projects a slight distance beyond the rear rim of the body 30 as clearly shown in FIG. 4. This rear rim of the body is formed with an internal annular recess 44 therearound such recess constituting a clearance area or region for the adjacent rim region of the clamping collar 40. The retaining ring 42 is formed with an external annular groove 46 therearound, such groove serving to loosely receive therein an inturned rim flange 48 which is provided on the adjacent circular rim of the collar 40. Internal threads 50 on the collar 40 are designed for threaded engagement with the external threads 21 of the aforementioned discharge spout 20 on the faucet 11. A rubber or other elastomeric sealing washer 39 of the garden hose variety is received within the collar 40 and seats against the rear end face of the retaining ring 42 when the collar is tightly received over the discharge spout 20. It will be understood, of course, that a similar sealing washer will be received within the clamping collar 22 of the hose 26 and will seat against the end face of the spout 20 when the latter collar is tightly received on such spout.

In order that air under pressure may be admitted to the interior of the body 30 for pressurizing the garden hose 26, a conventional check valve assembly 52 which may be of the conventional pneumatic tire valve type and includes a tubular air inlet valve stem or tube which has its inner end sealingly secured within a radial bore 54 which is formed in a thickened region or boss on the generally cylindrical body 30 and projects radially outwardly of such body from the medial region thereof. The check valve assembly 52 is provided with the usual protective closure cap 56 but when it is desired to inject air into the body 30 the cap will be removed from the valve stem and replaced by the coupling of an air hose or other fitting which may be associated with a hand pump of the bicycle variety, or other source of air under pressure. Various forms of check valve fittings are suitable for use in connection with the device 10 of the present invention, one such fitting being manufactured and sold by Milton Products Co. of Johnstown, Ohio under the trade name Tech.

In the operation and use of the garden hose evacuating device 10, the same is coupled to the water faucet 11 and hose 26 in the manner illustrated in FIG. 1. Such coupling of the parts may be accomplished by initially installing the device 10 on the faucet 11 by the simple expedient of threading the clamping collar 40 onto the male threads 21 of the faucet spout 20 and tightening the same, thereby compressing the sealing washer 39 between the annular end face of the spout and the annular end face of the retaining ring 42. During application of the device 10 to the faucet 11, the enlarged octagonal section 35 of the body 30 may be used as an anti-torque reaction member to prevent rotation of the body while the collar 40 is being applied. Thereafter the proximate end of the hose 26 may be attached to the device 10 by similarly threading the clamping ring or collar 22 which is associated with the hose 26 over the male threads 38 of the body 30, thereby compressing the hose washer against the end face of the front or male end of the body 30 and sealing the hose 26 to the device 10. With the parts thus assembled the device 10 functions in the manner of an adapter and when the control handle or knob 16 is operated to open the valve mechanism of the faucet 11, water will flow through the device 10 freely and unobstructedly so that the normal functioning of the garden hose 26 will not be altered. After a period of garden hose use, the control handle or knob 16 may be manipulated to shut off the flow of water from the faucet and the garden hose may be left in position on the ground, loosely coiled, reeled, racked or otherwise disposed of while still attached to the device 10 until such time as the hose is again put to use, at which time it is necessary only to manipulate the control knob 16 and open the faucet.

It is to be noted at this point that because the clamping collar 40 and body 30 are relatively rotatable, the latter is circumferentially adjustable on the faucet 11. Therefore, during initial installation of the device on the faucet the operator will hold the body 30 in such a position that the side of the building offers no obstruction to application of an air hose to the check valve 52. Obviously the body 30 may be adjusted in the same manner to avoid interference by nearby or adjacent objects.

Normally, during above-freezing weather, it is unnecessary to evacuate the residual water content of the garden hose after a given period of use and, in such weather, no attention whatsoever need be given the device 10, the latter remaining in place on the faucet and functioning, as aforesaid, simply as an adapter through which water may flow freely. However, when the hose is to be used or stored out of doors during sub-freezing weather, it is desirable that after each use where a prolonged period of idleness is anticipated the hose be evacuated in order to avoid appreciable lengths of frozen water within the hose, the presence of which might lead to hose rupture due to internal ice expansion or to cracking open of the hose when bending stresses are applied to such frozen sections.

Accordingly, with the hose in a fully extended condition, a partially coiled or a fully coiled condition, evacuation of the hose of its water content may be effected by removing the cap 56 from the check valve 52 and applying the female nipple fitting of a compressed air hose or tube leading from a hand pump, an air compressor or other source of compressed air. Where a hand pump is concerned, the first several strokes of the pump will serve to evacuate a major portion of the water from the hose, such water being displaced by air which enters the body 30 and passes forwardly into the proximate end of the hose. Thereafter, when the hose content is largely air, localized quantities of water will flow in between pump blasts to any low spots which may exist. In the case of a horizontally coiled hose, there will be very little residual water content but in the case of a vertically coiled or reeled hose the relatively small mean diameter of the involutely wound coils is seldom sufficiently large that localized water flow to the bottom regions of the individual coils will completely block a continuous air path through the hose. Under such circumstances the small "puddles" of water which may collect in the bottom regions of the hose coils offer no expansion hazard insofar as subsequent freezing is concerned inasmuch as they do not fill the cross section of the hose and, upon freezing thereof, merely constitute short lengths of ice which are subsequently melted and thus dissipated the next time that fresh water is passed through the hose. Neither do these frozen "puddles" present any danger of hose rupture due to subsequent uncoiling of the hose since their longitudinal extent is not large and they readily slide into the hose contour when the hose is straightened and are subsequently melted and washed away. Where a continuous air supply is available for hose evacuation purposes no problem of water drainback is encountered since a supply of air at even a pressure as low as 10 psi is adequate to literally blast the water from coil to coil and outwardly from the distal end of the hose. If there is sufficient residual water to completely block the cross-section of the hose, expansion due to freezing will tend to be along the axis of the hose and will not exert a rupturing force in a radial direction.

Figure 7:
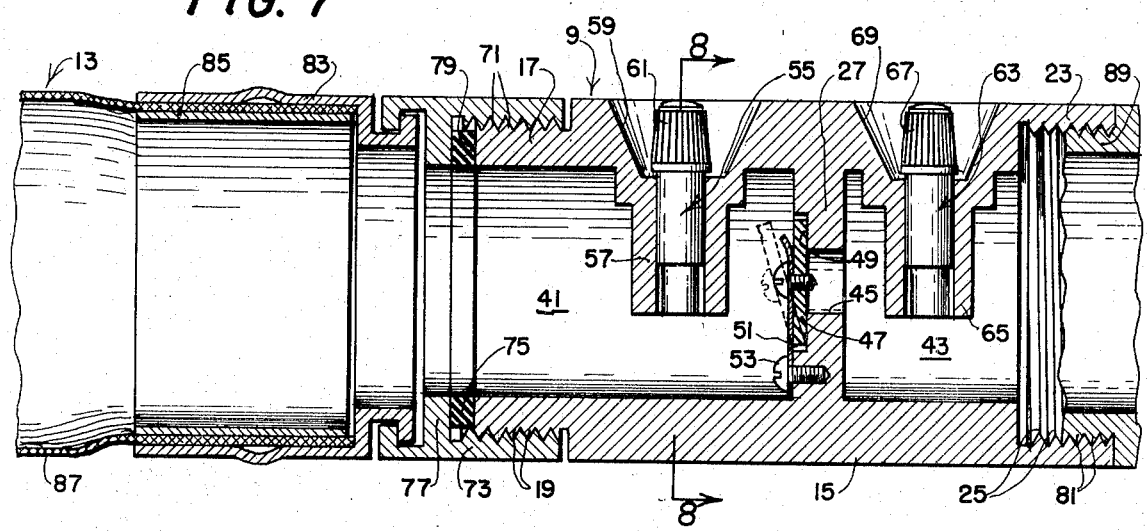
FIG. 7 is a sectional view taken substantially and centrally through a modified form of the hose-pressurizing device.
Figure 8:
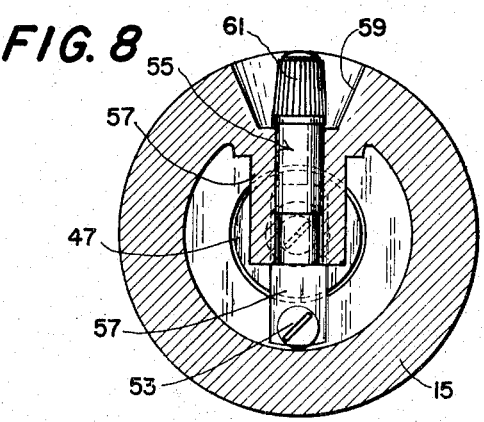
FIG. 8 is a sectional view taken substantially on the line 8—8 of FIG. 7.
Figure 9:
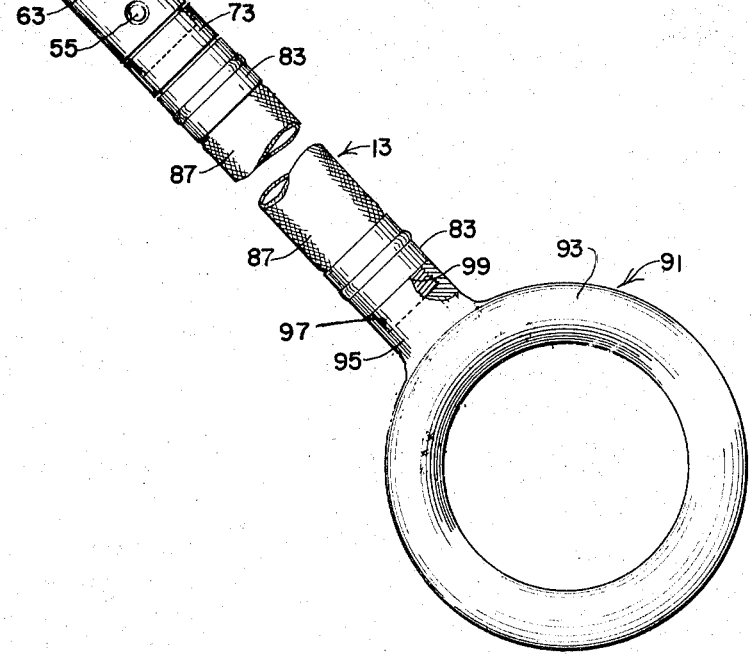
FIG. 9 is a fragmentary plan view of a fire hose assembly showing a plurality of the modified hose-pressurizing devices of the present invention operatively associated therewith.

In the modified form of the invention shown in FIGS. 7, 8 and 9, the invention is shown in connection with a conventional fire hose such as is commonly in use by metropolitan or community fire departments. In this form of the invention a pneumatic fire hose pressurizing device 9 is designed for attachment to a conventional fire hose section 13 of the type having a rotatable clamping collar at its proximate end for attachment to a fire hydrant. The purpose of the device 9 is to pressurize the interior of a fire hose section to which it is applied to inflate such hose section and thus effectively rigidify the hose section to such an extent that it may be pushed forwardly and outwardly endwise from a shore installation over a sheet of surface ice on a lake, pond or the like and thus projected into the vicinity of a breakthrough where it may be grasped by the person undergoing rescue, after which it may be used as a tow-in device. In this manner there will be no danger of the accident being compounded by the necessity of the rescue crew travelling over the surface of the ice. However, when it is found essential that the rescue crew travel on the ice, the hose section may serve as a life line to facilitate such travel.

Accordingly, and with reference to FIG. 7, the device 9 involves in its general organization a generally tubular cylindrical body 15 having a forward reduced end section 17 provided with external male threads 19, and a rear section 23 provided with internal female threads 25. A partition wall 27 divides the body 15 into front and rear chambers 41 and 43. The wall 27 is provided with a central opening or port 45 which is normally maintained closed by a spring-biased flap valve 47 which seats in a circular recess 49. A leaf spring 51 secured by a screw 53 serves to normally maintain the flap valve 47 closed.

Still referring to FIG. 7, identical means are provided whereby pressurized air may be selectively introduced into the chambers 41 and 43, the means for pressurizing the compartment 41 being in the form of a check valve assembly 55 which may be similar to the check valve 52 associated with the previously described form of the invention. The valve stem of this check valve is encased within an internal boss 57 which extends radially inwardly of the cylindrical body 15. A socket or recess 59 is formed externally in the body 15 and encompasses the outer end region of the check valve, as well as the protective closure cap 61 which is associated with the check valve. The means for pressurizing the compartment or chamber 43 is in the form of a check valve 63 including a tubular valve stem which is similarly encased within a boss 65 and has its outer end region and protective closure cap 67 nested within a socket 69.

The male threads 19 at the forward end of the cylindrical body 15 are designed for mating engagement with the internal female threads 71 which are associated with the conventional clamping collar 73 at the proximate end of a fire hose section 13 to which the device 9 is applied and, when such collar is fully received over the reduced end 17 of the body 15, an elastomeric sealing gasket 75 is effectively clamped between an internal rib 77 which is associated with the collar 73 and the forward circular end face 79 of the body 15. The internal female threads 25 in the rear end section 23 of the body 15 are designed for mating engagement with the male threads 81 which are provided at the distal end of a fire hose section 13.

The fire hose section (or sections) 13 to which the present device 9 may be applied is purely conventional, such sections differing in specific details among the various manufacturers of fire hoses. In the illustrated form of fire hose section, the aforementioned rotatable clamping collar 73 is rotatably carried on a composite end fitting assembly consisting of an outer fitting body 83 and an inner expansion sleeve 85, between which body and sleeve the rubberized fabric of the flexible hose proper 87 is clamped. Similarly, at the distal end of the fire hose section 13, the aforementioned external male threads 81 are formed on a similar fitting assembly a portion or fragment of which appears at 89 in FIG. 7.

In the operation and use of the fire hose pressurizing device 9 of the present invention, it is contemplated that a number of such devices will constitute a portion of the rescue equipment of a fire department and that these devices, together with a supply of truck-mounted fire hose will be transported to a scene of rescue operations. Assuming that the offshore incident which necessitates rescue operations lies within the range of a single 50 foot fire hose section 13, one of the devices 9 will be applied to the proximate end of such section in the manner previously described while at the same time a flotation device 91 such as has been disclosed in FIG. 9 will be threadedly received over the distal male end of the fire hose section. The flotation device 91 functions in the manner of a life preserver and it also functions as a stopper to block the free passage of air from the distal end of the fire hose section. Accordingly, this flotation device is preferably comprised of a circular ring 93 of low specific gravity material such as "Styrofoam" or other plastic material having a large multiplicity of occluded void therein, together with a Nylon or other attachment fitting 95 of stem-like design and which is formed with a threaded socket 97 at its outer end designed for threaded reception of the external male threads 99 which are formed on the end fitting 89 at the distal end of the fire hose section 13.

After such application of the pressurizing device 9 and the flotation device 91 to the fire hose section 13, compressed air is applied to the check valve 55 to distend the fire hose section and rigidify the same. During such expansion of the hose section, the latter may be directed outwardly over the intervening sheet of surface ice endwise until the flotation device 91 comes within reach of the person undergoing rescuing. Thereafter, when such person has seized or otherwise captured the flotation device 91, the fire hose 13 may be deflated, if desired, by uncoupling the pressurizing device 9 therefrom and the thus collapsed fire hose employed in the manner of a rope to pull the person to safety over the surface of the ice. It will be understood, of course, that the application of air to the fire hose section 13 may be maintained throughout the entire rescue operation to compensate for possible fire hose leakage, during which time the flap valve 47 will remain seated over the opening 45 to prevent egress of air through the otherwise open rear end of the device 9.

It may be found that in certain instances a single section 13 of fire hose is not adequate to reach the person undergoing rescuing. In such a situation, after a first fire hose section has been fully inflated and thus rigidified, it may be pushed outwardly over the sheet of ice so that the proximate end thereof moves into the vicinity of the shoreline, after which the distal end of a second fire hose section 13 will be threadedly attached to the rear female end section 23 of the device 13 while a sealing cap or stopper will be applied to the proximate end of such second fire hose section. Inflation of the second hose section may then be accomplished by pressurizing the chamber 43 through the medium of the check valve 63, after which the first fire hose section, together with such portion of the second fire hose section as is required to attain the necessary fire hose span may be pushed outwardly over the sheet of ice, the device 9 moving bodily with the two hose sections which it serves to couple together. Additional fire hose sections may be employed to further increase the distance at which rescue operations may be carried out. If, for example a third fire hose section 13 is required, the distal end of such hose section will be coupled to the rear end section 23 of the last installed or second pressurizing device 9 and the third hose section inflated in the manner previously described, utilizing the check valve 63 for inflation purposes. It will be obvious that continuous application of air to the check valve 63 of the rearmost pressurizing device 9 will maintain constant pressure and replace leakage through the entire system.

It is to be noted in connection with the modified form of the invention that the body 15 of the device 9 presents a substantially uninterrupted cylindrical outer surface, the diameter of which is substantially equal to that of the fire hose or hoses to which it may be applied. This constitutes one of the numerous advantageous features of the invention in that when adjacent sections 13 are coupled together by means of one of the devices 9, a substantially continuous cylindrical surface will be afforded with no radial projections extending therefrom which, otherwise, would hamper sliding of the hose sections over the ice. This feature of the invention is made possible by the recess-confined check valve caps 61 and 67 and the fact that the diameter of the body 15 is equal to that of the attachment fittings at the ends of the hose sections 13. A further advantageous feature resides in the fact that when plural fire hoses 13 are coupled to the device 9, pressurizing air applied to the check valve 63 will not only pressurize the adjacent rearmost fire hose but it will also supply air to the other section to replace any air which may have escaped from the latter, the flap valve 47 yielding as shown in dotted lines in FIG. 7.

The invention is not to be limited to the exact arrangement of parts shown in the accompanying drawings or described in this specification as various changes in the details of construction may be resorted to without departing from the spirit of the invention. For example although the body portions 30 and 15 of the devices 10 and 9 respectively have been indicated as being in the form of a moldable plastic material, it is within the purview of the invention to construct them of metal by either a casting or machining operation. Similarly, although the flotation device has been described as being constructed in part of "Styrofoam" or other similar material it is contemplated that such device may be hollow and formed of light weight metal. Also if desired, the circular ring 93 associated therewith may be of a hollow collapsible inflatable nature. Still further, it is not essential where two fire hose sections 13 are to be coupled together in the manner set forth that the device 9 be provided with a second check valve such as the valve 63. If desired, such check valve may be omitted and when two fire hose sections 13 are to be coupled together by means of the device 10, a second and similar pressurizing device may be applied to the proximate end of second fire hose 13 and the check valve 55 associated therewith employed for pressurizing the second hose. The purpose of having two check valves is to facilitate successive pressurizing of both fire hoses at the same location without requiring that the operator take time to uncoil or unfold the second hose before pressurizing the same. The application of air pressure to the check valve 63 will, in a large measure, serve to automatically distend the second hose so that the proximate end thereof may readily be located for application thereto of either a second device 9 or a sealing cap or stopper as previously indicated. It should be borne in mind that, frequently, time is of the essence in effecting a successful rescue operation. Numerous other modifications of the invention are contemplated and therefore only insofar as the invention has particularly been pointed out in the accompanying claims is the same to be limited.

I claim:

1. A pneumatic fire hose attachment for pressurizing the interior of a section of fire hose to rigidify the same to the end that the rigidified section may be projected endwise over a sheet of surface ice for rescue purposes, said attachment comprising a tubular body having a front end and a rear end, and a longitudinal bore therein, a transverse partition wall extending across the bore and thus defining a first internal chamber having an open rim at one end of the body and a second internal chamber having an open end at the other end of the body, a series of threads on each end of the body and designed for threaded engagement with the adjacent end of a fire hose section, said body being provided with a pair of radial bores, one on each side of said partition wall, and in communication with said first and second chambers respectively, and a check valve for supplying air under pressure to each of said chambers for conduction through the open rim thereof to the adjacent fire hose section, each check valve including an air inlet tube sealingly disposed within the associated radial bore and having its outer end designed for reception thereover of an air injection fitting associated with a source of compressed air.

2. A pneumatic fire hose attachment as set forth in claim 1, wherein said pressure-responsive valve means is in the form of a flap valve which extends across said opening in the partition wall and is spring-biased against the rim region of the opening.

3. A pneumatic fire hose attachment as set forth in claim 1, wherein the threads on the front end of said body are external threads and the threads on the rear end of said body are internal threads.

4. A pneumatic water faucet attachment and hose adapter designed for interpositioning between an externally threaded spout on the faucet and a garden hose of the type having an internally threaded rotatable clamping collar at its proximate end, said attachment comprising an open-ended tubular body having a longitudinal bore and a rearwardly disposed counterbore extending therethrough, a rear end section provided with an internally threaded rotatable attachment collar designed for threaded engagement with said externally threaded spout whereby the body may be fixedly and operatively secured to the faucet in selected positions of rotational adjustment, an inturned rim flange on said attachment collar, a cylindrical retaining ring disposed within said counterbore and having an external annular groove into which said inturned rim loosely projects, said tubular body having a front end section provided with external threads designed for mating engagement with the internally threaded rotatable clamping collar on the proximate end of the hose, said body being provided with a radial bore in the medial region thereof, and a check valve for supplying air under pressure to the interior of said body for displacing residual water in the hose after the faucet has been closed, said check valve including an air inlet tube having its inner end sealingly disposed within said radial bore and having its outer end projecting radially outwardly beyond the confines of the tubular body, said air inlet tube being designed for reception thereover of an air fitting associated with a source of air under pressure, and unidirectional valve means disposed within said air inlet tube.

5. A pneumatic water faucet attachment as set forth in claim 4, wherein the rear end of said counterbore is formed with an annular recess therearound which establishes a clearance area for reception of the forward end of the attachment collar, said recess and annular groove being disposed in the same transverse plane of the tubular body and directly opposing each other.

* * * * *